W. J. BAUMANN.
HOT WATER BOTTLE.
APPLICATION FILED AUG. 17, 1917.
1,256,428.
Patented Feb. 12, 1918.
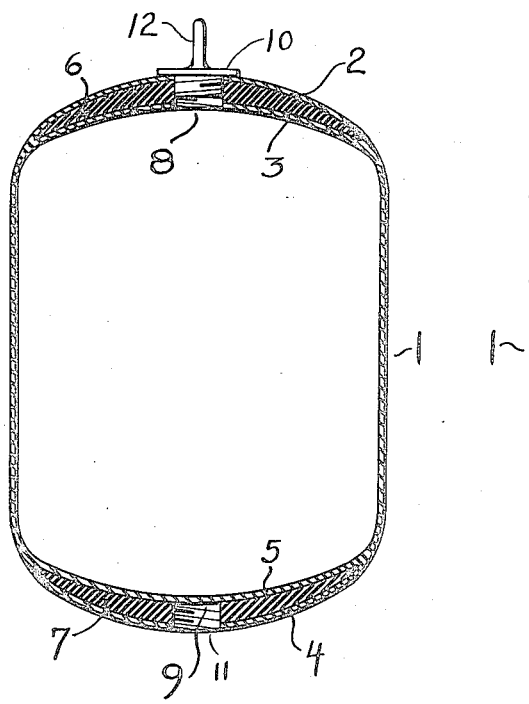
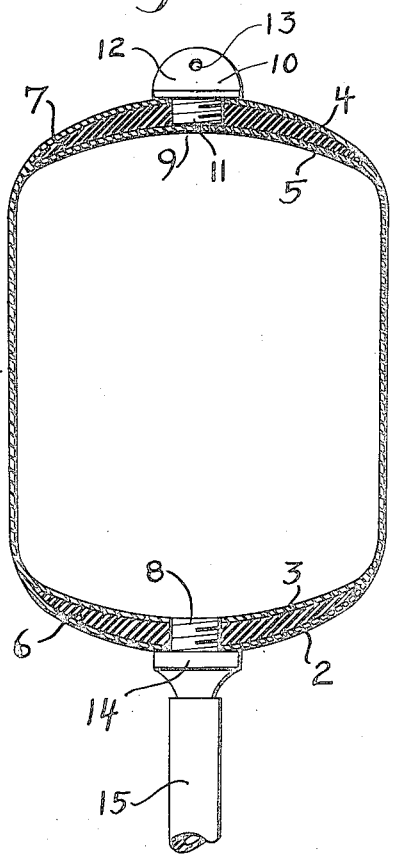
WITNESSES
INVENTOR
W. J. Baumann
BY Victor J. Evans
ATTORNEY

UNITED STATES PATENT OFFICE.

WILLIAM J. BAUMANN, OF RAPID CITY, SOUTH DAKOTA.

HOT-WATER BOTTLE.

1,256,428.  Specification of Letters Patent.  Patented Feb. 12, 1918.

Application filed August 17, 1917. Serial No. 186,806.

*To all whom it may concern:*

Be it known that I, WILLIAM J. BAUMANN, a native born citizen of the United States, residing at Rapid City, in the county of Pennington and State of South Dakota, have invented new and useful Improvements in Hot-Water Bottles, of which the following is a specification.

This invention relates to improvements in hot water bottles, one object of the invention being to provide an improved hot water bottle in which the usual funnel shaped filling nipple is dispensed with, the usual hanging strap is also dispensed with and to also effect improvements in the construction of the bottle at the ends, so that the ends of the bottle are kept hot, are strengthened and reinforced, and also provide means for filling the bottle and for hanging the same when it is desired to use the bottle as a fountain syringe.

The invention consists in the construction, combination and arrangement of devices hereinafter described and claimed.

In the accompanying drawings:—

Figure 1 is a sectional view of a hot water bottle constructed and arranged in accordance with my invention and showing the same closed.

Fig. 2 is a similar view of the same, in reversed position, and adapted to be hung in a suspended position and for use as a fountain syringe.

In accordance with my invention the wall 1 of a hot water bottle is divided at the ends and provided at one end with an outer portion 2 and an inner portion 3, and provided at the opposite end with an outer portion 4 and an inner portion 5.

I also provide fillers 6, 7 for the respective ends of the bottle and which are made of fiber and inserted between the inner and outer portions of the walls, at the bottle ends, and which fillers are tapered or narrowed from their centers to their end and side edges as shown. The fillers are respectively provided with centrally arranged threaded openings 8, 9. A plug 10, which is also made of fiber is adapted to be screwed in either of the said openings. At one end of the bottle the outer and inner wall portions 2, 3 are both provided with openings which correspond with the opening 8 for the reception of the plug. At the opposite end of the bottle the wall portion 4 has a similar opening 11 for the reception of the plug but the inner wall portion 5 is entirely imperforate and extends across and closes the inner end of the opening 9. The plug has a flattened lug 12 at its outer end, which is centrally arranged, to enable the plug to be readily turned and screwed or unscrewed, and the said lug has an opening 13 so that the bottle may be hung from a nail, cord or the like passed through the said opening, the plug serving as a handle wherewith to suspend or hang the bottle.

When the hot water bottle is to be used as such the plug is screwed in the opening 8 as shown in Fig. 1. When the hot water bottle is to be used as a fountain syringe the same is reversed, the plug is screwed in the opening 9 to enable the bottle to be suspended and the attaching nipple 14 of a tube 15 is screwed in the opening 8.

The bottle may be of any size and may be made of any suitable material.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. A hot water bottle provided at the ends with inner and outer wall members spaced apart, and fillers in the spaces between said wall members so that the inner surfaces of said fillers are entirely covered by the inner wall members, the bottle being further provided with an opening at one end and a socket at the other and with a plug for insertion in either said opening or said socket.

2. A hot water bottle provided at the ends with inner and outer wall members spaced apart, and fillers in the spaces between said wall members so that the inner surfaces of said fillers are entirely covered by the inner wall members, the bottle being further provided with an opening at one end and a socket at the other and with a plug for insertion in either said opening or said socket, the inner wall member at one end of the bottle extending entirely across and closing the inner end of the opening in the filler.

In testimony whereof I affix my signature.

WILLIAM J. BAUMANN.